Figure 1:
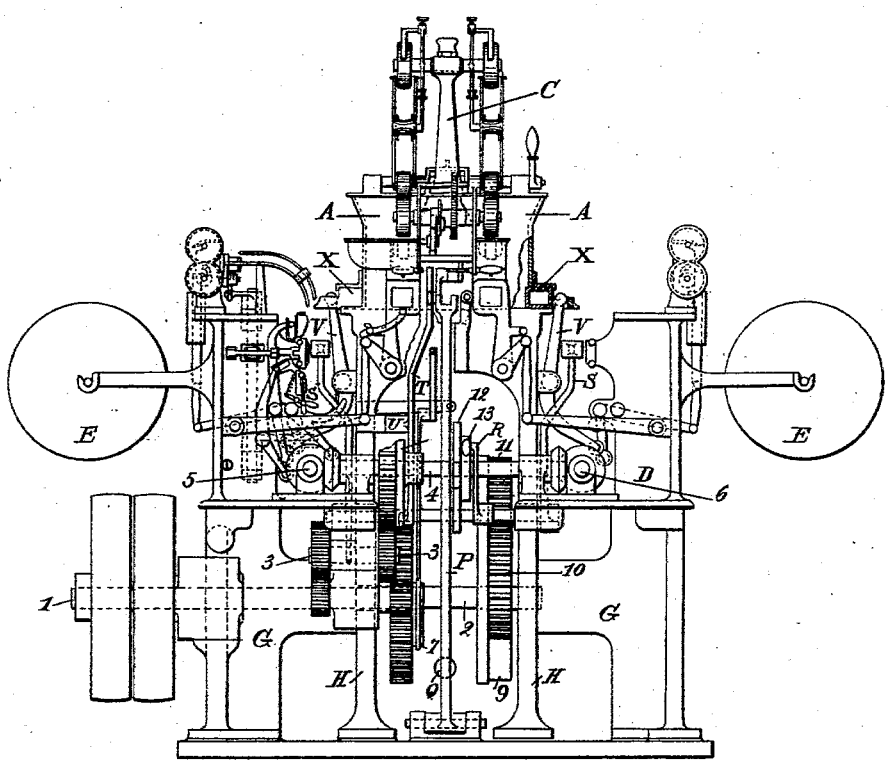

No. 715,340. Patented Dec. 9, 1902.
E. BELOT.
MACHINE FOR PACKETING TOBACCO OR OTHER LIKE MATERIALS.
(Application filed Aug. 11, 1900.)
(No Model.) 9 Sheets—Sheet 1.

No. 715,340. Patented Dec. 9, 1902.
E. BELOT.
MACHINE FOR PACKETING TOBACCO OR OTHER LIKE MATERIALS.
(Application filed Aug. 11, 1900.)
(No Model.) 9 Sheets—Sheet 2.

Witnesses:
Horace G. Seitz
D. S. Elmore

Inventor,
Emile Belot,
by Marion & Marion
his Attorneys.

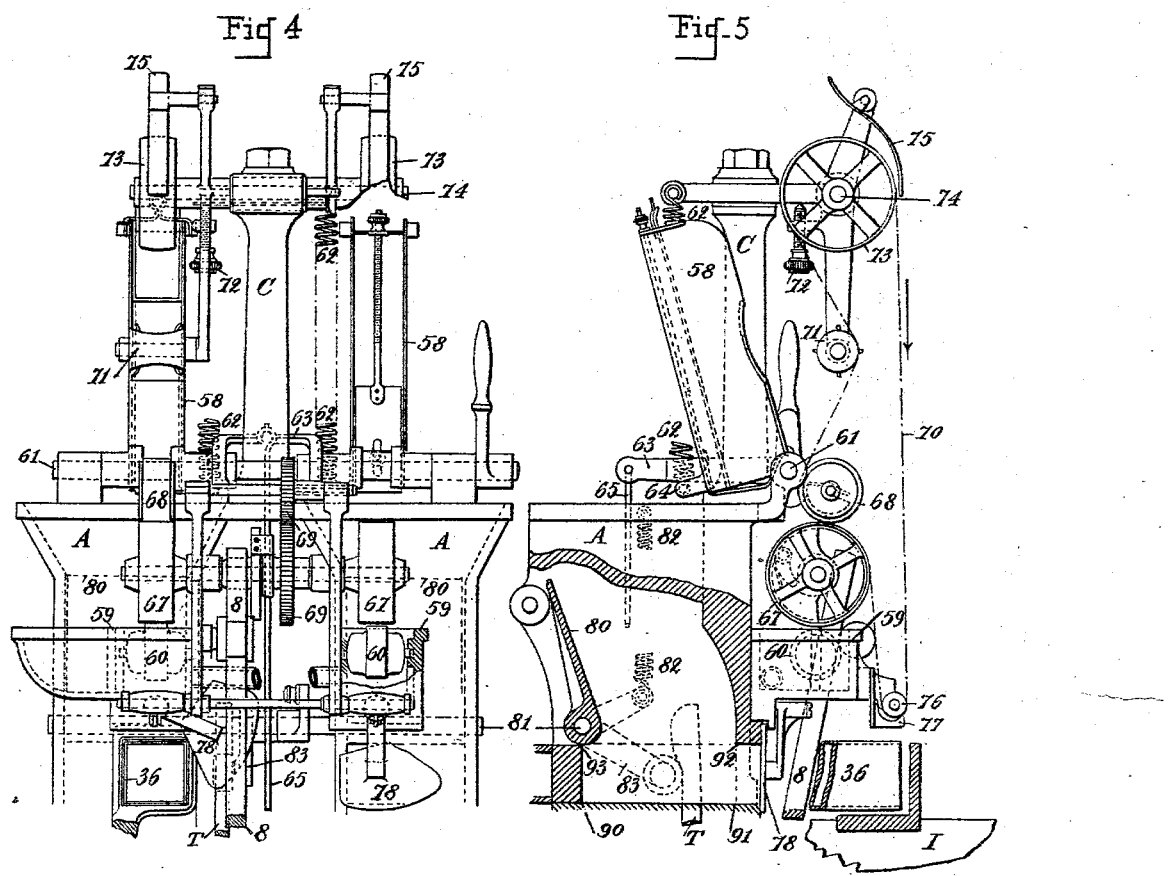

No. 715,340. Patented Dec. 9, 1902.
E. BELOT.
MACHINE FOR PACKETING TOBACCO OR OTHER LIKE MATERIALS.
(Application filed Aug. 11, 1900.)
(No Model.) 9 Sheets—Sheet 4.
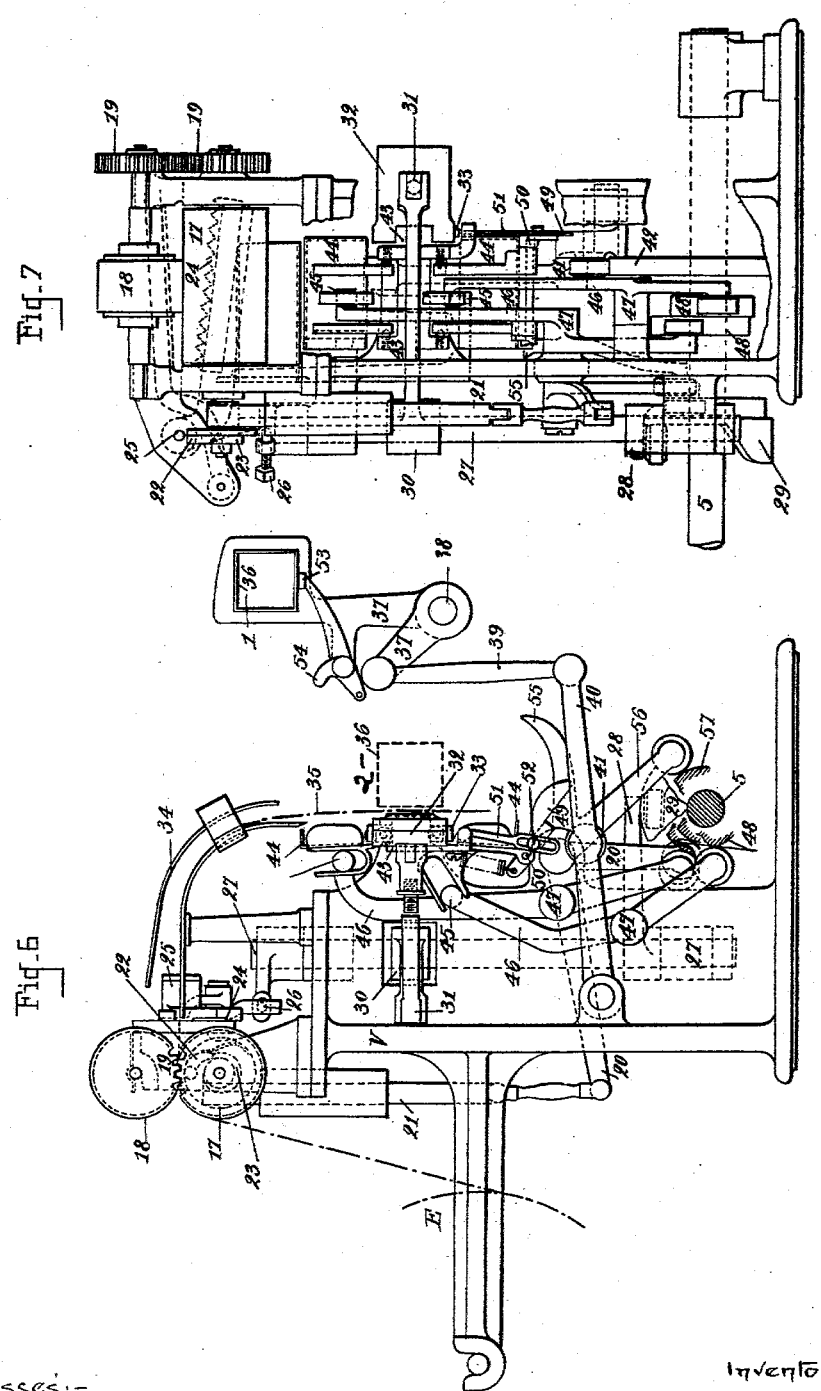
Witnesses:-
Horace G. Deitz
P. J. Edmore
Inventor:-
Emile Belot,
by Marion & Marion
his Attorneys.

No. 715,340. Patented Dec. 9, 1902.
E. BELOT.
MACHINE FOR PACKETING TOBACCO OR OTHER LIKE MATERIALS.
(Application filed Aug. 11, 1900.)
(No Model.) 9 Sheets—Sheet 5.
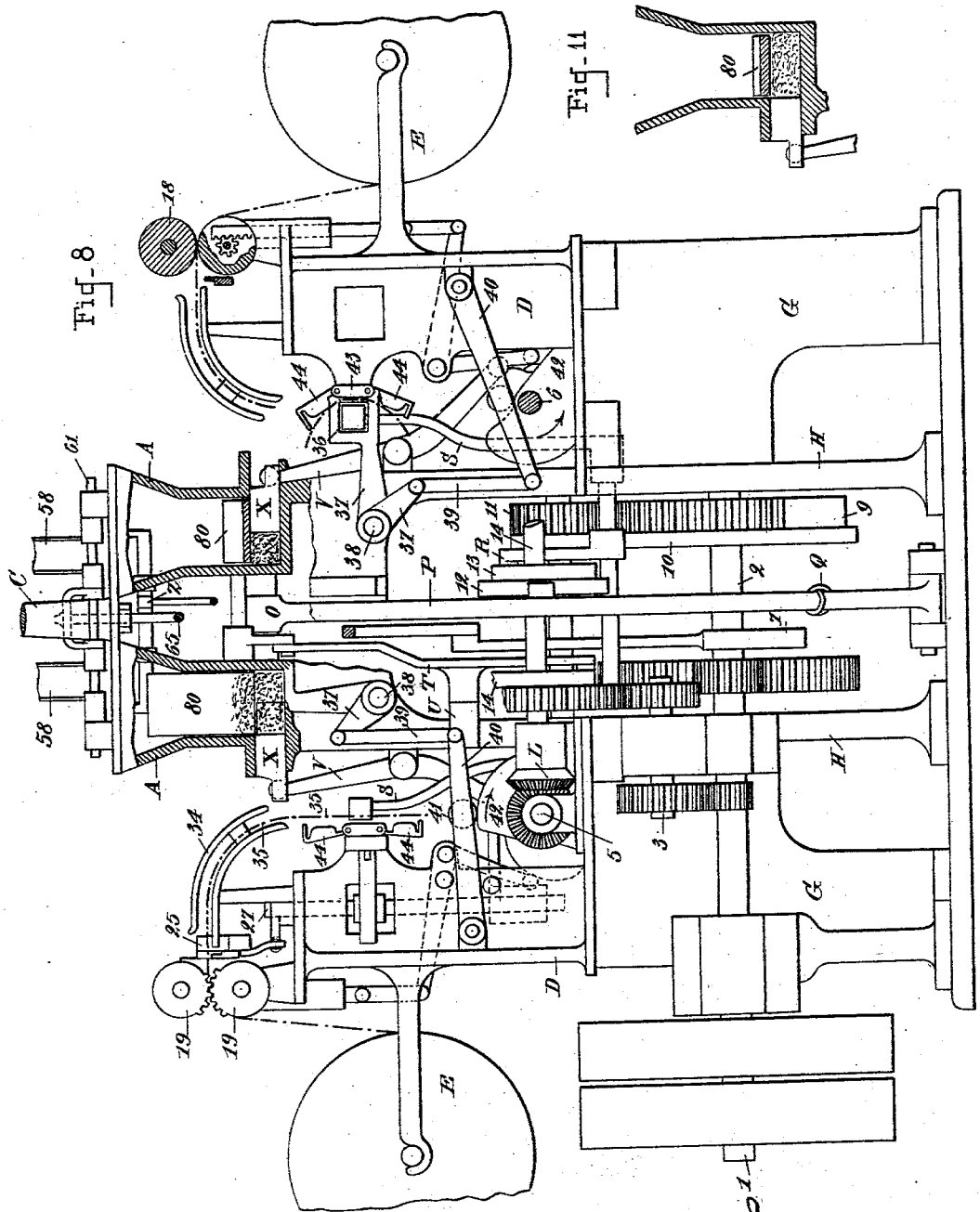

No. 715,340. Patented Dec. 9, 1902.
E. BELOT.
MACHINE FOR PACKETING TOBACCO OR OTHER LIKE MATERIALS.
(Application filed Aug. 11, 1900.)
(No Model.) 9 Sheets—Sheet 6.

No. 715,340. Patented Dec. 9, 1902.
E. BELOT.
MACHINE FOR PACKETING TOBACCO OR OTHER LIKE MATERIALS.
(Application filed Aug. 11, 1900.)
(No Model.) 9 Sheets—Sheet 7.
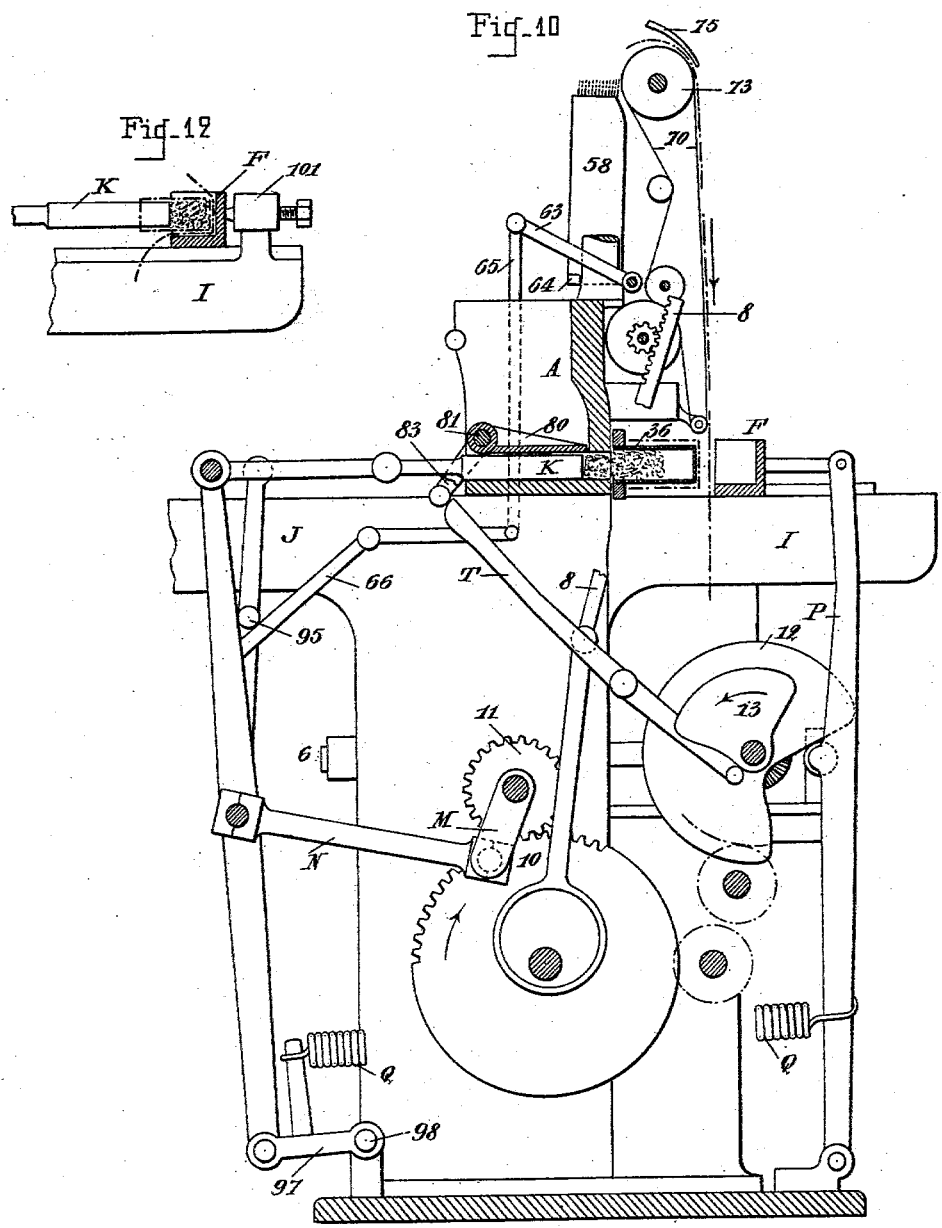

No. 715,340. Patented Dec. 9, 1902.
E. BELOT.
MACHINE FOR PACKETING TOBACCO OR OTHER LIKE MATERIALS.
(Application filed Aug. 11, 1900.)
(No Model.) 9 Sheets—Sheet 8.
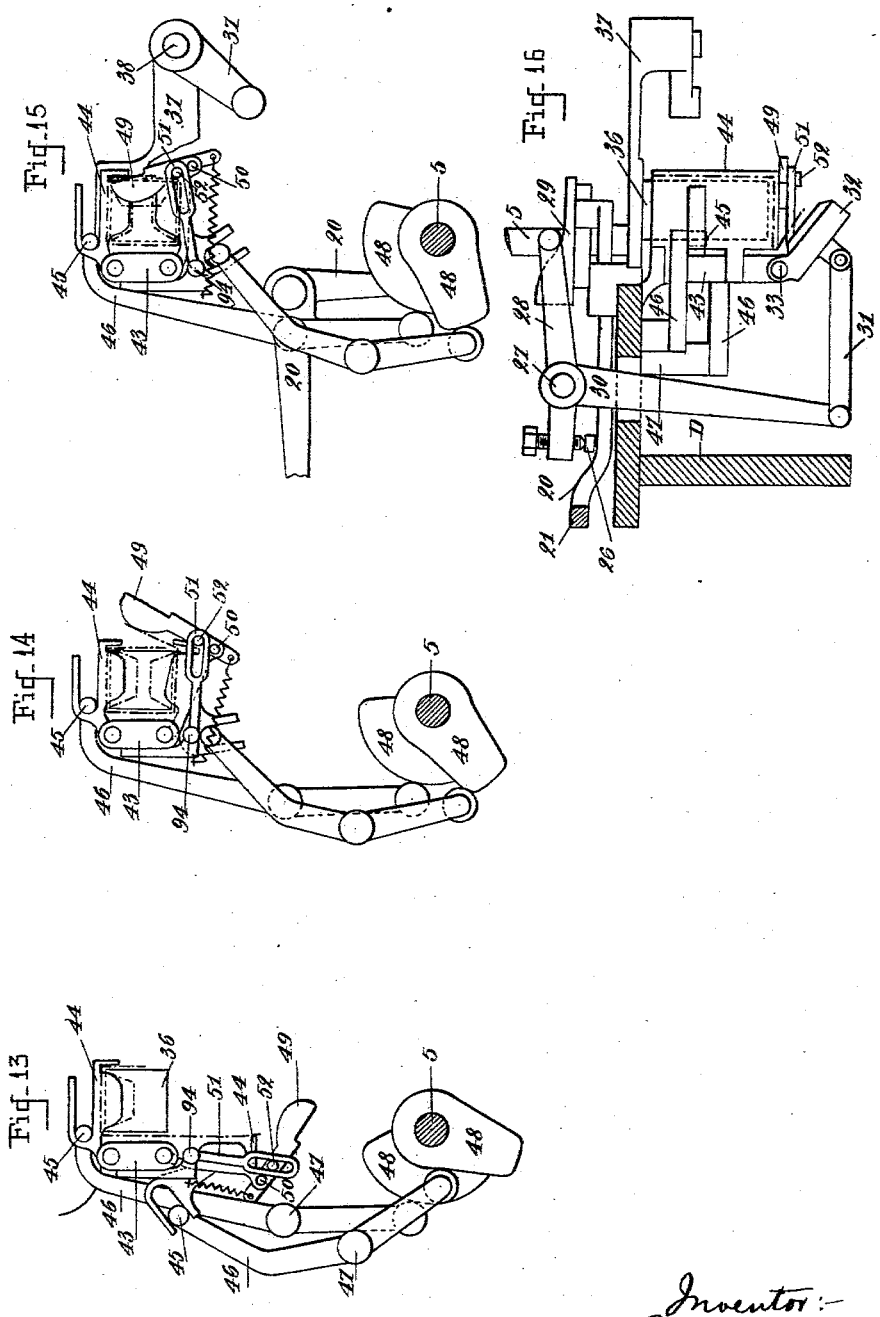

No. 715,340. Patented Dec. 9, 1902.
E. BELOT.
MACHINE FOR PACKETING TOBACCO OR OTHER LIKE MATERIALS.
(Application filed Aug. 11, 1900.)
(No Model.) 9 Sheets—Sheet 9.

UNITED STATES PATENT OFFICE.

EMILE BELOT, OF PARIS, FRANCE.

MACHINE FOR PACKETING TOBACCO OR OTHER LIKE MATERIALS.

SPECIFICATION forming part of Letters Patent No. 715,340, dated December 9, 1902.

Application filed August 11, 1900. Serial No. 26,690. (No model.)

*To all whom it may concern:*

Be it known that I, EMILE BELOT, a citizen of the French Republic, residing at Paris, in the department of the Seine, France, have invented certain new and useful Improvements in Machines for Packeting Tobacco or other Like Materials, of which the following is a specification.

This invention has been patented to me in France, No. 296,126, January 13, 1900.

My invention relates to a packeting-machine which automatically delivers the paper from a roll or web, automatically puts the labels on the charged packets, and gives the tobacco a pressure which can be easily regulated.

My packeting-machine essentially consists of a central mechanism destined to compress the tobacco in three directions when it arrives in loose lumps from the balance-scales, of two equal and symmetrical side mechanisms which serve to transform continuous tapes of paper into bags by means of hollow cores, of two intermediate mechanisms for the purpose of bringing the said cores bearing the bags in front of the orifices of the compressing-cases, of the mechanism placed on top of the central mechanism and destined to carry the gummed labels behind the bottom of the bags, and, finally, of a mechanism in relation with the central compressing mechanism in order to receive in vessels borne by a carriage the packets filled, provided with labels, and ready to be closed by hand.

Figure 2:
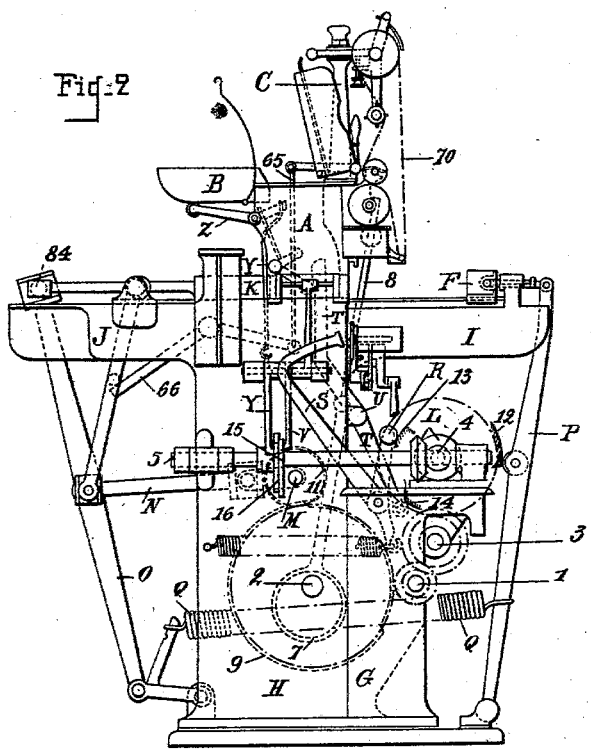
Figure 3:
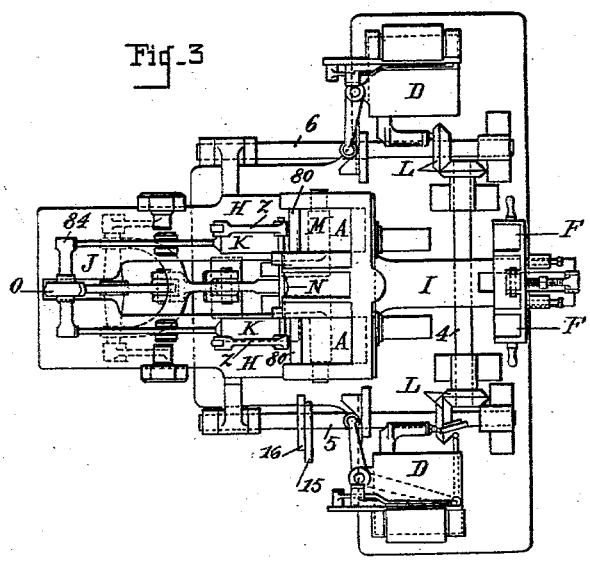
Figure 9:
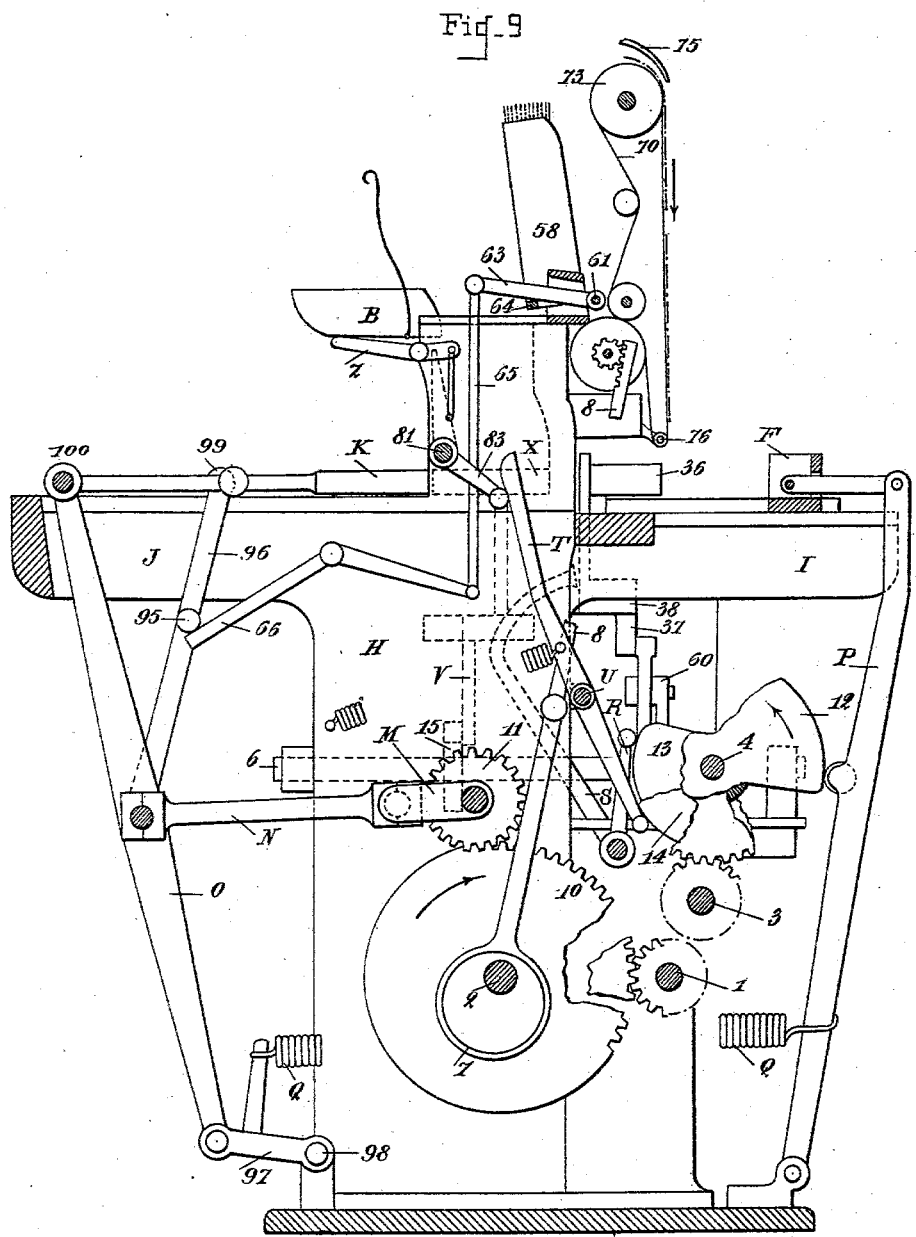
Figure 17:
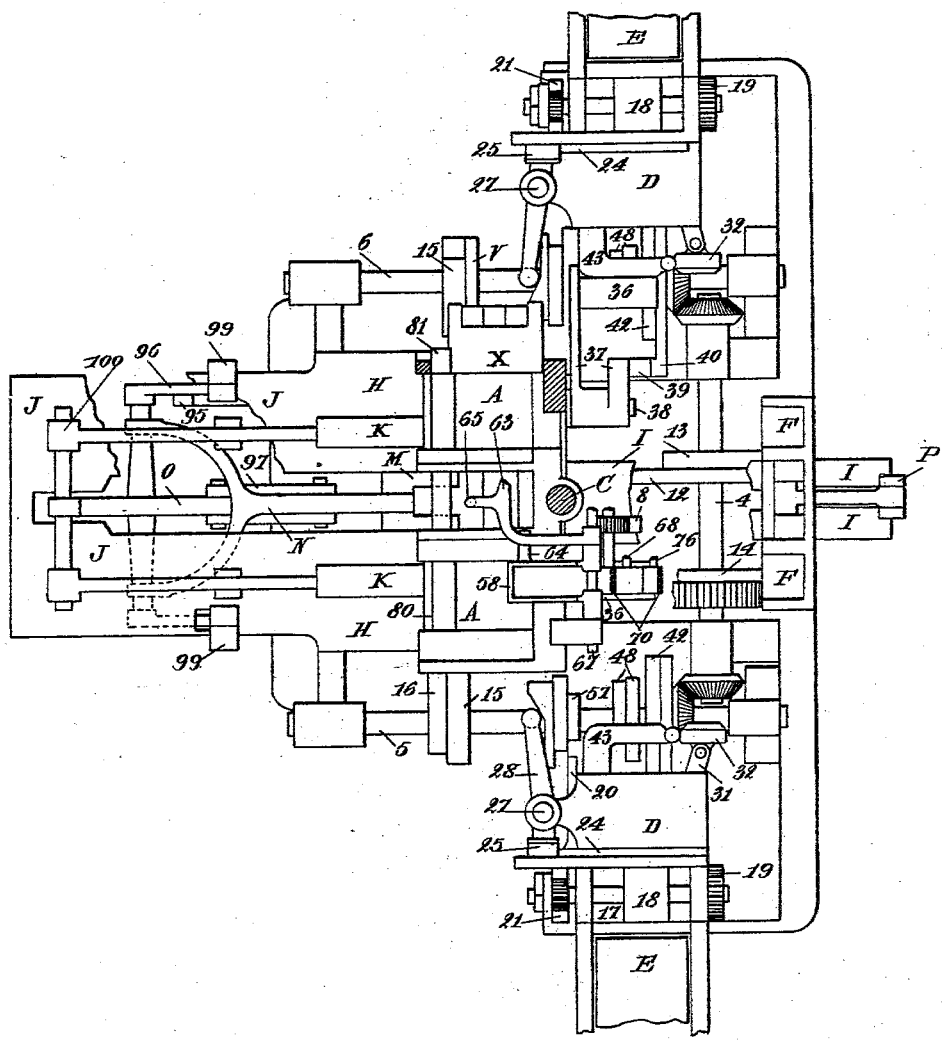

Figure 1 is a front view, and Fig. 2 is a side view, of the machine. Fig. 3 is a plan from which are omitted certain details relating to the labels and the making of the bags. Fig. 4 is a front view of the tobacco-cases and the label mechanism. Fig. 5 is a side view of the same, showing the tobacco-cases partly in section. Fig. 6 is a front view, and Fig. 7 is a side view, of the bag mechanism. Fig. 8 is a front view like that of Fig. 1, but on a larger scale and wherein the bags, represented in their details in Figs. 13, 14, 15, and 16, have been removed from the details of the mechanism. The tobacco-cases are represented in section, and the symmetrical right and left parts of the mechanism are shown in different phases of their compressing the tobacco and carrying the bags. Figs. 9 and 10 are side views like that of Fig. 2, but on a larger scale and partly in section, showing different phases of the compressing of the tobacco and of the rolling off and handling of the labels. Fig. 11 is a separated section of one of the tobacco-cases at the moment when the compression is going on through the flaps and rammers provided for this purpose. Fig. 12 is a partial section of the carrier bringing on a terminated packet. In Figs. 9, 10, 11, and 12 the paper and the labels are shown by a mixed line ———————. Figs. 13, 14, and 15 show details of the elements of the machine. Fig. 16 is a plan view of Fig. 15. Fig. 17, at last, is a plan view like that of Fig. 3, but on a larger scale and showing some accessory elements not represented in Fig. 3.

The same reference letters and numerals denote the same parts in the several figures.

The machine comprises two tobacco-cases A, each provided with a balance-scale B, two mechanisms for gumming and placing the labels carried by the column C, two bag-machines, quite symmetrical, carried by the frame D, Figs. 1, 2, and 3, and carrying the paper-rolls E. By this combination the machine can occupy two weighing females placed each in front of one of the balance-scales B, and a workwoman placed in front of the two-celled carriage F, Figs. 2 and 3, which brings her the packets, which she finishes and removes, one with each hand.

The general frame of the machine comprises two feet G, the left one of which carries the main shaft 1. The feet G carry the bag-machines D. They are connected to the cheeks H, which have between them the mechanism for packing and pressing the tobacco and carry the tobacco-cases A and the column C. The cheeks H are connected on the one side in an arch, forming a bracket I, which carries the packet-carriage F, and on the other side in a bracket J, which carries the mechanism for the longitudinal rammers K of the tobacco.

The main shaft 1 drives the shafts 2 and the counter-shaft 3, which communicates motion to the shaft 4, which in its turn drives by bevel-gear the shafts 5 and 6, that carry the cams for the bag mechanisms.

The shaft 2 has on it an eccentric 7, which works the rack 8 for the label movement, and the mutilated wheel 9, having a toothed sector 10. This wheel gears intermittently with the wheel 11 on the crank-shaft M, which by the connecting-rod N works the beam O, Fig. 3.

The shaft 4 carries, Figs. 1 and 2, the cam 12, regulating the movements of the beam P, which is always shaved by the spring Q, giving pressure to the tobacco, as hereinafter described, the cam 13 working the levers R S of the plugs of the bag-bottoms and the cam 14 working the lever T, pivoted at U.

The shaft 5 carries the same cams as the shaft 6 for making the paper bags, and the same cam 15 disposed symmetrically so as to work on each side by the levers V each of the lateral rammers X of the tobacco. On the right of Fig. 1 part is broken away to show the lateral rammer X, which gives the tobacco a horizontal pressure in the tobacco-case. The shaft 5 also carries the cam 16, working the lever Y, which gives reciprocation to the levers Z, that raise the balance-scales B.

The two bag-machines are quite symmetrical relatively to the vertical middle plane of the machine. Consequently it is only necessary to describe the left-hand machine, Figs. 6 and 7.

In Fig. 7 the vertical wall V is supposed to be removed to show the mechanism. The paper indicated by the dot-and-dash line --- is drawn through between the rollers 17 and 18, which are connected by equal gearing 19. The bell-crank lever 20, worked by a cam fixed on the shaft 5, gives an up-and-down motion to the rack 21, gearing with a pinion having on it the disk 22, carrying a pawl which acts on a one-toothed ratchet 23, fixed on the shaft of the roller 17, so as to cause it to rotate intermittently. The paper after passing the rollers 17 18 passes over a toothed knife 24, pivoted at 25 and worked by the setting-screw 26, which receives a reciprocating motion around the axis 27, on which is fixed the lever 28, worked by a roller acted on by a helicoidal cam on the shaft 5. The same axis 27 moves the lever 30, to which is jointed the rod 31, which serves to push the presser 32 of the bottom folds, which turns about the vertical axis 33. Two or more teeth of the knife are a little deeper than the others, as is common in analogous machines, so as not entirely to cut the paper, so that after the cut each sheet sticks to the next, and after passing under the curved guard 34 it takes the vertical position 35. As shown in the right-hand part of Fig. 8, each time when the folding-wings 44 are caused to turn around the core 36 they separate a sheet of paper from the following, breaking the light adherence of the paper, whereby the sheets are kept together. Each of the hollow cores 36 of sheet-steel is mounted on an angle-armed lever 37, which can turn one-quarter around the axis 38, being worked by a rod 39, jointed to a lever 40, the roller 41 of which is raised by a cam 42 on the shaft 5. In the position where the paper folds around the core to form the bag (indicated by the dotted lines 2 36) the core has been lowered by the above mechanism to face the plate 43, which carries the folding-wings 44 and the axis 33 of the bottom-presser. Each of these wings, Fig. 7, is caused to turn on a horizontal pivot fixed in the plate 43 one-quarter around by the rollers of the lever 46, caused to turn around 47 by cams 48 on the shaft 5. Each wing 44 has three faces which wind two by two at right angles, Fig. 6, so that each wind determines the fold over two longitudinal faces of the core and one of the bottom folds. The lower wing differs from the upper only by the addition of the pallet 49, pivoted at 50 on the wing itself, so that when the wing rises through ninety degrees the slotted rod 51 at a certain moment meets the pin 52 on the pallet 49, causing it to form the third bottom fold of the bag.

On Figs. 13, 14, and 15, where the presser 32 is removed for the sake of greater clearness, it is distinctly to be seen how the successive folding of the paper around the core 36 is obtained. In Fig. 13 two longitudinal folds and the first fold of the bottom are determined by the upper folding-wing 44. In Fig. 14 the third longitudinal fold is determined by the rising of the lower folding-wing, while the slotted rod 51, turning on the stationary pivot 94, begins to act on the pin 52 of the pallet 49. In Fig. 15 it is shown how the fourth longitudinal fold and the second and third folds of the bottom are terminated, this last fold through the pallet 49.

On Fig. 16, which is a plan view of Fig. 15, it will be seen how the presser 32 by pressing on the bottom of the core 36 forms the fourth bottom fold and keeps all the others on the sheet of the core and, should this be necessary, on the ends of the pressers fastened to the extremities of the lever S, Figs. 8 and 9. Finally, a presser 53, traveling with the lever 37, maintains the longitudinal fold of the bag until it is filled. For this purpose in order to allow the paper to fold around the core 36 the lug 54 of the presser comes in contact with the end 55 of the lever 56, which is worked by the cam 57 on the shaft 5. The lug 54 then lifts the presser off during the folding of the paper and lets it return on the folded paper.

The mechanism for bringing the gummed labels to the bottom of the bags, Figs. 4 and 5, consists of two similar parts corresponding, respectively, to the two tobacco-cases A. On the right side of Fig. 4 parts are broken away to show the label-box 58 and the gummer 59, with its float 60. The label-boxes 58 rock freely on the shaft 61. Springs 62, fixed to the top of the column C, always urge the label-boxes to turn on 61 from left to right, Fig. 5.

A lever 63 of U form is fixed on the shaft 61. Each of its limbs bearing on studs 64, fixed on the boxes 58, prevents it from obeying the springs 62. The lever 63 is worked by the rod 65 and the bent lever 66, Fig. 2. The aluminium floats 60, immersed in the gum-reservoirs 59, distribute the gum under the gum metal drivers 67, which are intermittently moved by ratchet and pawl by means of the rack 8. The rotation of the drums 67 is communicated to the drivers 68 by gear 69. Between the drums 67 and 68 pass endless tapes 70, of fabric served with caoutchouc, which are thus gummed and intermittently moved in the direction of the arrow. These tapes pass partly around the stretching-roller 71, adjusted by screws 72, and over the drums 73, which are free on the shaft 74, under the guards 75, and under the free roller 76. Every time that the boxes 58, filled with labels in an almost vertical position, can obey the springs 62 and approach the gumming tapes 70 a label adheres to each tape to be then led by it in the direction of the arrow applied to its surface by the guard 75. Each label by its weight and the part 77 is detached from the tape and hangs in gummed condition behind the bottom of the bag on the core 36.

In Fig. 9 the rack 8 is shown at the moment when it is caused by the eccentric 7 to begin its rising in order to produce the rolling off of the tape 70. In Fig. 10 the rolling off of the tape as required is terminated, and a label is suspended behind the bottom of the bag. It is, furthermore, shown in Fig. 9 how the label-box 58 is kept afar as long as required from the glued tape 70 by means of the lever 63 and the pin 64; but as the said box is caused to rise through the action of the spring 62, Fig. 5, it executes this movement, Fig. 10, as soon the roller 95, depending on the mechanism O N, acts on the lever 66. Thereby a label will be affixed with its upper extremity on the tape 70.

Oscillating pieces 72 are provided as stops for preventing the tobacco from leaving the cases A until the cores 36 come to close the mouths of these cases.

The tobacco undergoes the following operations: Being passed into the cases A by the balance-scales B, worked by the levers Z, it is inclosed in the lower parts of the cases A by the flaps 80, which rock on the shaft 81, Figs. 4 and 5. These flaps are constantly urged to open by springs 82. They are closed by the lever T bearing against the roller on the end of the lever 83. When closed, the faces of the flaps 80 are horizontal. The tobacco then occupies the space bounded by the rectangles 90 91 92 93, on which laterally press rammers X of the same area worked as previously described. After the action of these lateral rammers the tobacco is squeezed to the section of the hollow cores 36, which is the same as that of the faces of the rammers K. These latter, which are joined to the cross-head 84, worked by the beam O, as previously described, begin to move horizontally and force the tobacco out of the cases A, the stop 78 being then out of the way. The tobacco enters the interior of the cores 36, which are clad externally by the paper bags, Figs. 4 and 5. At the same time the carriage F, urged by the spring Q, acting on the beam P, slides along the upper part of the bracket I from the position shown in Fig. 2 to that shown in section in Fig. 5, incasing the cores 36 and applying to the bottoms and lower sides of the bags the gummed labels hanging from the tapes 70. The rammers K continue their horizontal strokes, pass through the cores 36, forcing the tobacco into the bags, the bottoms of which bear on the vertical sides of the cells F, with a pressure regulated by the spring Q. The cell-carriage F is thus moved back to the position shown in Fig. 2, with the two packets filled with tobacco, compressed, and furnished with labels. It only remains for the workwoman to close the packets by means of the gummed labels and to take them out of the cells F. During this operation the cam 12 keeps the carriage at rest without allowing it to obey the spring Q.

The different phases of the compressing work are shown in their succession in the Figs. 8, 9, 10, 11, and 12. In Fig. 8, left side case, the tobacco in loose state is dropped into the said case, where it receives the first compression by the flap 80, which comes down and incloses the tobacco in the case, Fig. 11. Immediately thereafter (right side case of Fig. 8) it receives a compression in a lateral direction through the press-rammer X, acting in a direction perpendicular to that of the first compression. The third compression at last is effected in a direction perpendicular to the two first ones through the longitudinal rammers K, worked through the action of the beam O, forming, with the rod 97, which oscillates on the point 98, and with the rods 96, which oscillate on the points 99, a system of such a nature that the axis 100, whereon the rammers K are articulated, is compelled to describe a straight line. In the measure as the brace M turns, Fig. 10, the rammers K advance from the left side to the right side, and Fig. 10 shows the tobacco at the very moment when it passes from the case A into the core 36, furnished with its bag. At the same moment the carriage F arrives at the bottom of the bag and there affixes the label suspended from the tape 70. At last, Fig. 12, the rammer K being at the extremity of its stroke on the right-hand side has driven back the carriage F, surmounting the antagonistic effort of the spring Q, acting through the medium of the tobacco contained in the packet. The latter is thereby brought into the carriage F, where it may be still more compressed when it comes to the end of its run by the abutting device 101, provided with an adjustable screw. The rammers K return to their position shown in Fig. 9 by traversing the empty cores.

It is to be understood that the core 36 is raised from the position shown in dotted lines in Fig. 6 to that indicated by full lines in the same figure and that the tobacco is then inserted while the core is in the latter position.

Having thus described the nature of this invention and the best means I know for carrying the same into practical effect, I claim—

1. In a packing-machine for tobacco, &c., means for compressing material in three directions at right angles embodying flaps pivotally mounted, reciprocating celled carriages, lateral rammers, longitudinal rammers, packet-making mechanism and coöperating devices for actuating said flaps and carriages, substantially as described.

2. In a packing-machine of the class described, the combination with the tobacco-cases and a shaft and its operating means, of hinged flaps mounted to rock in said cases on said shaft, springs acting on said flaps to urge them open, a lever acting on said shaft and carrying a roller, a lever disposed to act upon said roller, and a cam for actuating the last-mentioned lever.

3. In a packing-machine of the class described, the combination with the tobacco-cases and a shaft and its operating means, of hinged flaps in said cases at the bottoms thereof mounted to rock on said shaft, springs acting on said flaps to urge them open, a lever acting on said shaft and carrying a roller, a lever disposed to act upon said roller and a cam for actuating the last-mentioned lever, rammers, reciprocating celled carriages, cores through which said rammers work and means for providing an adjustable pressure for the bottoms of the bags on the vertical sides of the cells of said carriages.

In testimony that I claim the foregoing as my invention I have signed my name in presence of two subscribing witnesses.

EMILE BELOT.

Witnesses:
 EDWARD P. MacLEAN,
 JULES FAYOLLET.